(12) United States Patent
Liang (10) Patent No.: US 10,969,538 B2
(45) Date of Patent: Apr. 6, 2021

(54) BACKLIGHT MODULE AND LIQUID CRYSTAL DISPLAY DEVICE

(71) Applicants: HKC Corporation Limited, Guangdong (CN); Chongqing HKC Optoelectronics Technology Co., Ltd., Chongqing (CN)

(72) Inventor: Shuozhen Liang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/758,529

(22) PCT Filed: Dec. 20, 2017

(86) PCT No.: PCT/CN2017/117311
§ 371 (c)(1),
(2) Date: Apr. 23, 2020

(87) PCT Pub. No.: WO2019/080327
PCT Pub. Date: May 2, 2019

(65) Prior Publication Data
US 2020/0257030 A1 Aug. 13, 2020

(30) Foreign Application Priority Data
Oct. 25, 2017 (CN) .......................... 201711015782.6

(51) Int. Cl.
*F21V 8/00* (2006.01)
*G02F 1/1335* (2006.01)
*G02F 1/13357* (2006.01)

(52) U.S. Cl.
CPC ........... *G02B 6/009* (2013.01); *G02B 6/0068* (2013.01); *G02B 6/0085* (2013.01);
(Continued)

(58) Field of Classification Search
CPC .... G02B 6/009; G02B 6/0085; G02B 6/0068; G02F 1/1336; G02F 1/133615; G02F 1/133628; G02F 2001/133628
See application file for complete search history.

(56) References Cited

U.S. PATENT DOCUMENTS 8,727,596 B2 * 5/2014 Sakamoto ............. G02B 6/009
362/611
8,736,788 B2 * 5/2014 Kim ..................... G02B 6/0085
349/67

(Continued)

FOREIGN PATENT DOCUMENTS

| CN | 1816261 A | 8/2006 |
| CN | 202266936 U | 6/2012 |

(Continued)

OTHER PUBLICATIONS

Satoshi Yoshida, "Lighting Device and LCD Device Provided with Same", Mar. 22, 2012, Machine Translation of WO 2012035898 a1, WIPO IP Portal, pp. 1-12.*

*Primary Examiner* — Alan B Cariaso
(74) *Attorney, Agent, or Firm* — Muncy, Geissler, Olds & Lowe, P.C.

(57) ABSTRACT

A backlight module and a liquid crystal display device are provided. The backlight module includes a heat-dissipating body, a light source and a back plate. A side wall of the back plate includes a through hole portion. The heat-dissipating body is detachably installed at an outer side of the side wall of the back plate and covers the through hole portion, and the light source is received inside the through hole portion.

18 Claims, 5 Drawing Sheets

(52) U.S. Cl.
CPC ...... *G02F 1/1336* (2013.01); *G02F 1/133628* (2021.01); *G02F 1/133615* (2013.01)

(56) References Cited

U.S. PATENT DOCUMENTS

| | | | | |
|---|---|---|---|---|
| 2006/0221641 A1* | 10/2006 | Yoon | ................... | G02B 6/0068 |
| | | | | 362/623 |
| 2011/0273904 A1* | 11/2011 | Tajiri | .................... | H05K 1/181 |
| | | | | 362/606 |
| 2013/0141670 A1* | 6/2013 | Yang | ................ | G02F 1/133608 |
| | | | | 349/69 |
| 2014/0218618 A1* | 8/2014 | Sasaoka | ............... | G02B 6/0085 |
| | | | | 348/725 |
| 2015/0098247 A1* | 4/2015 | Shin | ....................... | G02B 6/009 |
| | | | | 362/611 |
| 2015/0212260 A1* | 7/2015 | Li | .......................... | G02B 6/009 |
| | | | | 362/608 |
| 2019/0384113 A1* | 12/2019 | Cheng | ............... | G02F 1/133603 |

FOREIGN PATENT DOCUMENTS

| | | | |
|---|---|---|---|
| CN | 102818185 A | 12/2012 | |
| CN | 105158971 A | 12/2015 | |
| CN | 205880439 U | 1/2017 | |
| CN | 106455449 A | 2/2017 | |
| CN | 206283767 U | 6/2017 | |
| CN | 107039906 A | 8/2017 | |
| CN | 206546483 U | 10/2017 | |
| CN | 207366893 U | 5/2018 | |
| JP | 2003002050 A | 1/2003 | |
| WO | WO-2012035898 A1 * | 3/2012 | ........... G02B 6/0085 |

\* cited by examiner

BACKLIGHT MODULE AND LIQUID CRYSTAL DISPLAY DEVICE

BACKGROUND

Technical Field

This disclosure relates to the display technology and, in particular, to a backlight module and a liquid crystal display device.

Related Art

In general, the backlight module includes optical films, a light guiding plate, LED light bars, aluminum extruded components and a back plate. The aluminum extruded components are disposed inside the side wall of the back plate and contacted with the backs of the LED light bars for dissipating the heat of the LED light bars.

However, when the LED light bar of the backlight module of the liquid crystal display device is broken and needs to be repaired or replaced, it is needed to remove many components including the front case of the liquid crystal display device, the display screen, the optical films of the backlight module, and the likes before retrieving the aluminum extruded components and the LED light bar. After repairing or replacing the LED light bar, the aluminum extruded components and the LED light bar are installed inside the side wall of the back plate, and then the optical films, the display screen and the front case are assembled in order. The procedures for repairing or replacing the LED light bar are complicated, so the performance of repairing or replacing the LED light bar is lowered. Besides, the display screen, the optical films and other components may be damaged during the repairing or replacing. This will increase the damage risk of the display screen, the optical films and other components.

SUMMARY

This disclosure provides a backlight module and a liquid crystal display device that can improve the performance of repairing or replacing the light source, and decreasing the damage risk of other components during the procedure of repairing or replacing the light source.

This disclosure provides a backlight module comprising: a heat-dissipating body; a light source disposed on the heat-dissipating body; and a back plate including at least one side wall. The side wall of the back plate includes a through hole portion. The heat-dissipating body is detachably installed at an outer side of the side wall of the back plate and covers the through hole portion, and the light source is received inside the through hole portion.

In the backlight module of this disclosure, the heat-dissipating body is provided with a recess, and the light source is disposed in the recess.

In the backlight module of this disclosure, the backlight module further includes a frame sealant. A side wall of the frame sealant opposite to the heat-dissipating body is provided with a through hole, and a size of the through hole is not less than a size of the heat-dissipating body.

In the backlight module of this disclosure, when the light source is received in the through hole portion, a light output side of the light source is at least aligned with an edge of the through hole portion.

In the backlight module of this disclosure, an end portion of the heat-dissipating body is aligned with a bottom portion of the back plate.

In the backlight module of this disclosure, the heat-dissipating body is installed at the outer side of the side wall of the back plate by engaging.

In the backlight module of this disclosure, the side wall of the back plate is provided with an engaging slot, and a side wall of the recess is engaged in the engaging slot so that the heat-dissipating body is detachably installed at the outer side of the side wall of the back plate.

In the backlight module of this disclosure, the heat-dissipating body includes an aluminum extruded back plate body.

This disclosure also provides a backlight module including: a heat-dissipating body provided with a recess; a light source disposed on the heat-dissipating body; and a back plate including at least one side wall. The side wall of the back plate includes a through hole portion and an engaging slot. A side wall of the recess is engaged in the engaging slot so that the heat-dissipating body is detachably installed at an outer side of the side wall of the back plate. The heat-dissipating body covers the through hole portion. The light source is disposed in the recess and received inside the through hole portion. A plurality of end portions of the heat-dissipating body are aligned with an edge of the side wall of the back plate.

This disclosure further provides a liquid crystal display device, including: a backlight module; and a display screen disposed at a light output side of the backlight module. The backlight module is any of the above backlight module of this disclosure.

This disclosure provides a backlight module and a liquid crystal display device. The heat-dissipating body of the backlight module is detachably installed at the outer side of the side wall of the back plate and covers the through hole portion disposed on the side wall of the back plate, and the light source is received inside the through hole portion. Accordingly, when the light source is damaged, the heat-dissipating body and the light source can be retrieved without disassembling the display screen, optical films and the likes. This design can reduce the operation difficulty of repairing or replacing the light source, increase the performance of repairing or replacing the light source, and prevent the damage of the display screen, optical films and other components so as to lower the damage risk of other components.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE DISCLOSURE

The embodiments of the disclosure will be apparent from the following detailed description, which proceeds with reference to the accompanying drawings, wherein the same references relate to the same elements. Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

In the description of this disclosure, it is to be understood that the terms "top", "bottom", "front", "back", "left", "right", "inner", "outer", and "side surface" indicating the orientation or position relationships are the orientation or position relationships based on the drawing, are only provided for the purposes of describing this disclosure and simplifying the description, but do not indicate or imply that the directed devices or elements must have the specific orientations or be constructed and operated in the specific orientations, and thus cannot be understood as the restriction to this disclosure.

In FIGS. 1 to 10, the similar structures or the same structures have the same references numbers.

Figure 1:
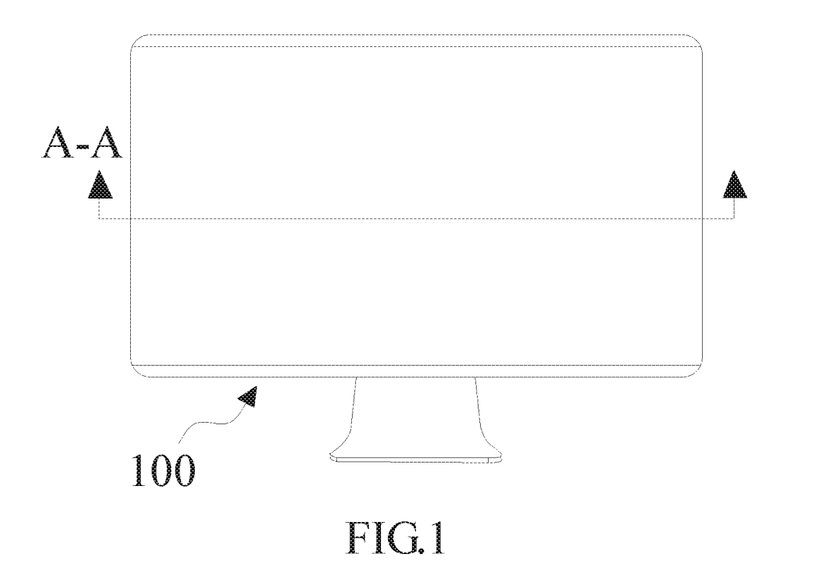
FIG. 1 is a structural schematic diagram of a liquid crystal display device according to an embodiment of the disclosure.
Figure 2:
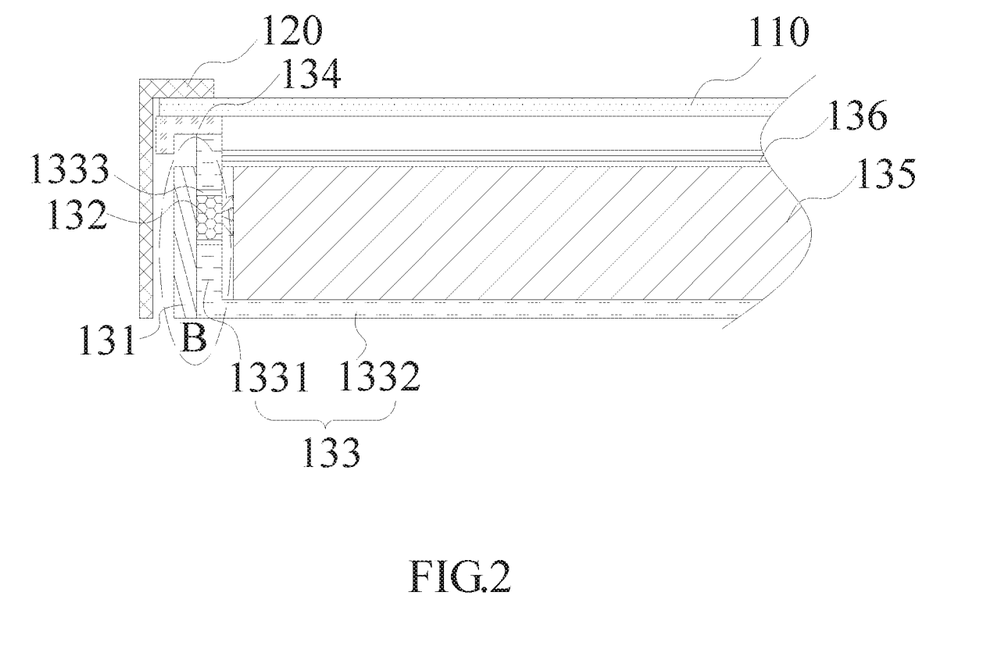
FIG. 2 is a sectional view of the liquid crystal display device of FIG. 1 along the direction A-A.

FIG. 1 is a structural schematic diagram of a liquid crystal display device according to an embodiment of the disclosure, and FIG. 2 is a sectional view of the liquid crystal display device of FIG. 1 along the direction A-A. To be noted, FIG. 2 only shows a part of a sectional view of the liquid crystal display device 100 along the direction 100, and the skilled persons in the art can easily understand the structure of the other part of the sectional view based on FIG. 2 and the current knowledge.

Referring to FIGS. 1 and 2, the liquid crystal display device 100 includes a display screen 110, a front case 120 and a backlight module. When the front case 120 is assembled on the backlight module, the display screen 110 is located between the front case 120 and the backlight module. Specifically, the display screen 110 is located at a light output side of the backlight module. In addition, in this embodiment, the display screen 110 can be, for example, a liquid crystal display screen.

As shown in FIG. 2, the backlight module includes a heat-dissipating body 131, a light source 132, a back plate 133, a light guiding plate 135, and optical films 136. The specific structure of the backlight module will be described in detail with reference to the figures. To be noted, the components of the backlight module are not limited to the components shown in FIG. 2, and may include other components not shown in FIG. 2. This disclosure is not limited.

The back plate 133 includes at least one side wall 1331 and a bottom portion 1332. The side wall 1331 extends from the edge of the bottom portion 1332 along a direction toward the display screen 110.

Figure 3:
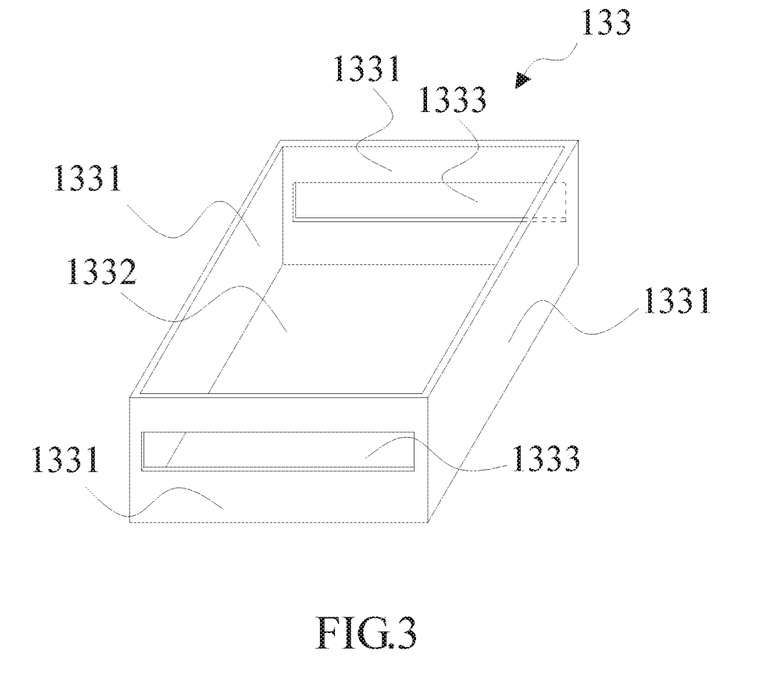
FIG. 3 is a structural schematic diagram of a back plate of the liquid crystal display device of FIG. 2.

In one embodiment as shown in FIG. 3, the multiple components of the backlight module are collected as a whole. FIG. 3 is a structural schematic diagram of a back plate of the liquid crystal display device of FIG. 2. The back plate 133 includes four side walls 1331, and the four side walls 1331 extend from four edges of the bottom portion 1332 along a direction toward the display screen 110. Thus, the four side walls 1331 and the bottom portion 1332 form an accommodating space for receiving the components of the backlight module therein.

To be understood, in other embodiments, the back plate 133 may include more or less side walls 1331, and the shapes of the side walls 1331 and the bottom portion 1332 of the back plate 133 are not limited to the shapes shown in FIG. 3. The structure of the back plate 133 shown in FIG. 3 is only for an experimental illustration, and is not to limit the structure of the back plate 133 of this disclosure.

The side wall 1331 of the back plate 133 is provided with a through hole portion 1333 as shown in FIGS. 2 and 3. In the back plate 133 of FIG. 3, two side walls 1331 are disposed opposite to each other, and each side wall 1331 is provided with a through hole portion 1333. Each through hole portion 1333 is corresponding to a light source 132. In other words, the backlight module includes two light sources 132, which are disposed at two sides of the backlight module, respectively.

Figure 4:
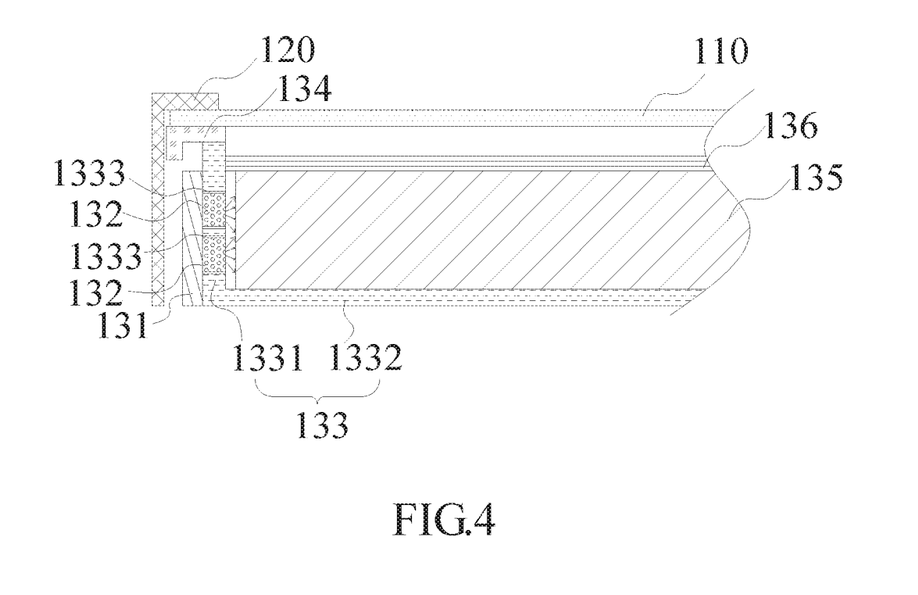
FIG. 4 is another sectional view of the liquid crystal display device of FIG. 1 along the direction A-A.

To be understood, in other embodiments, when the backlight module includes one or more light sources 132, the amount and positions of the through hole portions 1333 can be adjusted according to the amount and positions of the light sources 132. FIG. 4 is another sectional view of the liquid crystal display device of FIG. 1 along the direction A-A. As shown in FIG. 4, each of the two opposite side walls 1331 of the back plate 133 is provided with two through hole portions 1333. That is, the back plate 133 includes four through hole portions 1333. Thus, the backlight module correspondingly includes four light sources 132, which are located corresponding to the four through hole portions 1333.

In addition, the shape of the through hole portion 1333 is provide corresponding to the shape of the light source 132. In general, the light source 132 is a long-shape LED light bar, so the through hole portion 1333 has a strip shape as shown in FIG. 3. In other embodiments, the through hole portion 1333 may have a different shape, and this disclosure is not limited.

Figure 5:
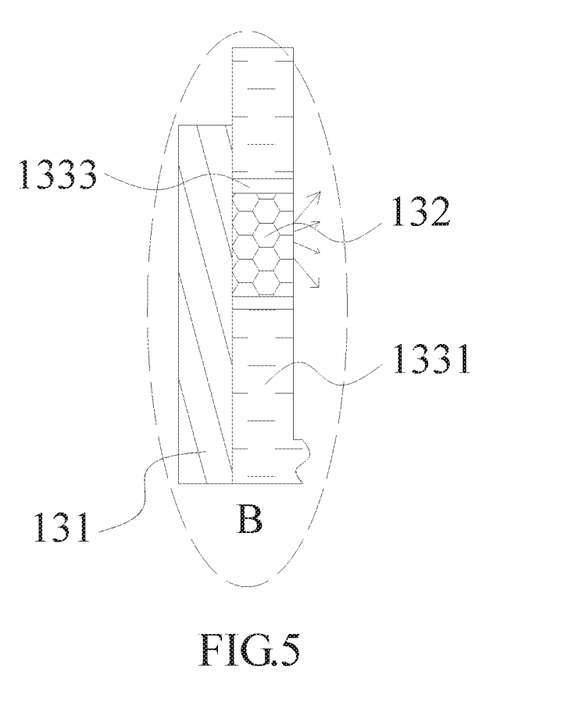
FIG. 5 is an enlarged diagram of the mark B of the liquid crystal display device of FIG. 2.

The through hole portion 1333 is used to receive the light source 132. FIG. 5 is an enlarged diagram of the mark B of the liquid crystal display device of FIG. 2. As shown in FIG. 5, the width of the through hole portion 1333 is greater than the width of the light source 132. In other words, in the vertical direction, the width of the through hole portion 1333 is greater than the width of the light source 132. Accordingly, the light source 132 can be took out via the through hole portion 1333.

In order to prevent blocking the light emitted from the light source 132 by the through hole portion 1333, the depth of the through hole portion 1333 is not greater than the thickness of the light source 132. That is, in the horizontal direction, the depth of the through hole portion 1333 is not greater than the thickness of the light source 132. In other words, a light output side of the light source 132 is aligned with an edge of the through hole portion 1333, or the light output side of the light source 132 is protruded from the edge of the through hole portion 1333. This design allows the light emitted from the light source 132 to pass through the light guiding plate 135 as much as possible, thereby increasing the light utility.

Of course, in other embodiments, the depth of the through hole portion 1333 can be greater than the thickness of the light source 132, so that the light output side of the light source 132 is completely accommodated in the through hole portion 1333.

As shown in FIG. 2, the light guiding plate 135 is disposed on the bottom portion 1332 of the back plate 133. The light input surface of the light guiding plate 135 is corresponding to the light source 132, and the incident light can travel through the light guiding plate 135 and be guided to the light output surface of the light guiding plate 135.

The optical films 136 are disposed on the light output surface of the light guiding plate 135, and the edges of the optical films 136 are contacted against the side wall 1331 of the back plate 133. The optical films 136 can uniform the light outputted from the light output surface of the light guiding plate 135, so that the light outputted from the optical films 136 can uniformly irradiate onto the display screen 110.

In one embodiment, the optical films 136 includes a diffuser, a brightness enhancement film and a reflective film. Herein, the diffuser, the brightness enhancement film and the reflective film are disposed in order along a direction from the light guiding plate 135 to the display screen 110. The diffuser can diffuse the light outputted from the light guiding plate 135 to make the light more uniform. The brightness enhancement film can be a prism film for selecting the inputted light. For example, the prism film can allow a part of the inputted light within the collecting light angle to pass through and reflect the residual part of the inputted light back to the light guiding plate 135. The reflected light will be scattered in the light guiding plate 135 and then transmitted back to the prism film again until fitting the desired angle. Thus, the brightness enhancement film can achieve the function of brightness enhancement.

The light source 132 is disposed on the heat-dissipating body 131. The light source 132 is connected to the heat-dissipating body 131 by a thermoconductive adhesive, so that the heat generated by the light source 132 can be dissipated through the thermoconductive adhesive and the heat-dissipating body 131.

The heat-dissipating body 131 is detachably installed at an outer side of the side wall 1331 of the back plate 133 and covers the through hole portion 1333 of the side wall 1331. To be understood, the light source 132 is received inside the through hole portion 1333.

Figure 6:
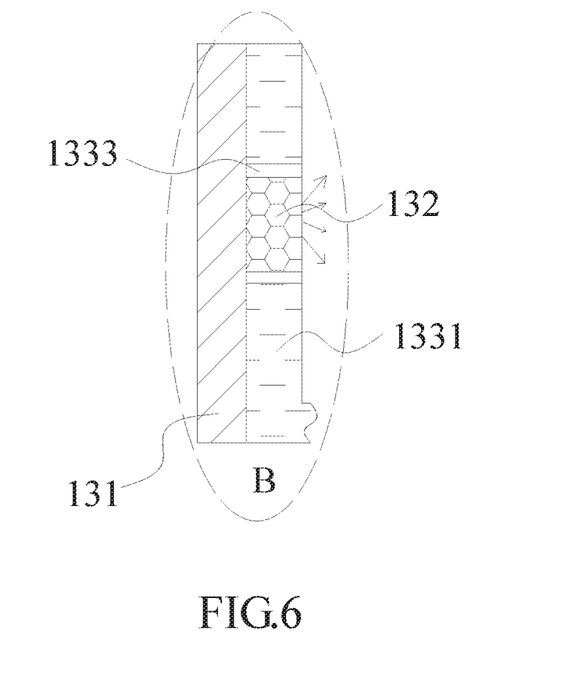
FIGS. 6 to 8 are other enlarged diagrams of the mark B of the liquid crystal display device of FIG. 2.

In one embodiment, as shown in FIGS. 2 and 5, an end portion of the heat-dissipating body 131 is aligned with the bottom portion 1332 of the back plate 133. FIG. 6 is another enlarged diagram of the mark B of the liquid crystal display device of FIG. 2. As shown in FIG. 6, in order to speed the heat dissipating rate of the heat-dissipating body 131, each end portion of the heat-dissipating body 131 is aligned with the edge of the side wall 1331 of the back plate 133. That is, the heat-dissipating body 131 completely covers the side walls 1331 of the back plate 133. This configuration can increase the heat-dissipating surface of the heat-dissipating body 131 so as to increase the heat-dissipating rate of the heat-dissipating body 131.

Figure 7:
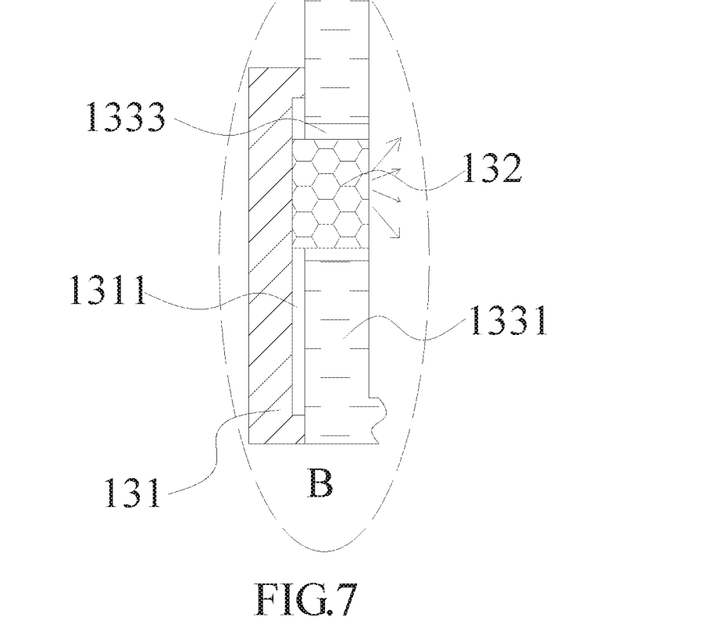

In one embodiment, the heat-dissipating body 131 can have a plate structure as shown in FIGS. 2 and 5, or a recess structure as shown in FIG. 7. FIG. 7 is another enlarged diagram of the mark B of the liquid crystal display device of FIG. 2. The heat-dissipating body 131 is provided with a recess 1311 for accommodating the light source 132.

To be understood, the structure of the heat-dissipating body 131 is not limited to the disclosed structure of this embodiment and can be any of other structures. For example, the heat-dissipating body 131 can be provided with a boss, and the light source 132 is installed on the boss. When the heat-dissipating body 131 is installed at the outer side of the side wall 1331 of the back plate 133, the boss and the light source 132 are received inside the through hole portion 1333.

In one embodiment, the heat-dissipating body 131 can be installed at the outer side of the side wall 1331 of the back plate 133 by a thermoconductive adhesive. Of course, the heat-dissipating body 131 can also be installed at the outer side of the side wall 1331 of the back plate 133 by screwing, engaging or the likes.

Figure 8:
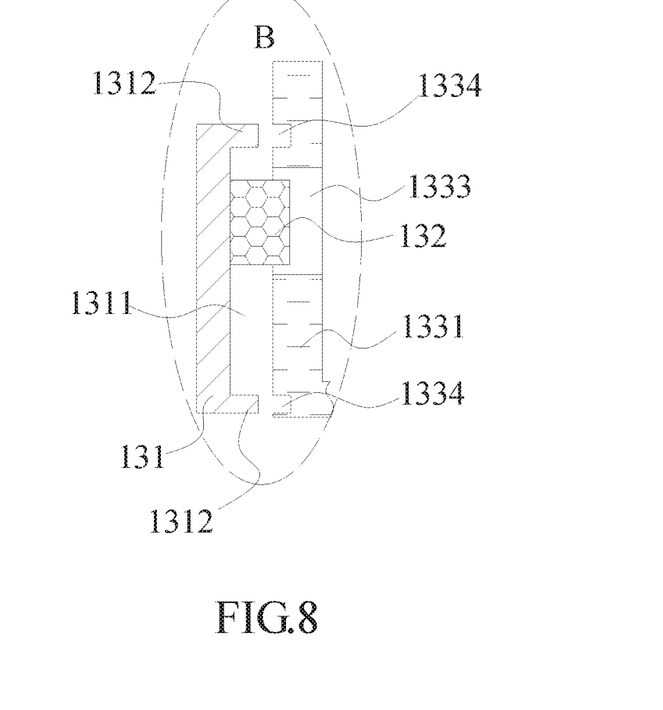

FIG. 8 is another enlarged diagram of the mark B of the liquid crystal display device of FIG. 2. To be noted, in order to more clearly understand the procedure to fix the heat-dissipating body 131 on the side wall 1331 of the back plate 133, the heat-dissipating body 131 and the side wall 1331 of the back plate 133 are separated in FIG. 8. As shown in FIG. 8, the side wall 1331 of the back plate 133 is further provided with an engaging slot 1334. Herein, the side wall 1331 of the back plate 133 is provided with two engaging slots 1334, which are located at the top and bottom of the through hole portion 1333. The shape of the engaging slots 1334 can be a strip shape. The side wall 1312 of the recess 1311 is engaged in the engaging slot 1334, so that the heat-dissipating body 131 is detachably installed at the outer side of the side wall 1331 of the back plate 133.

In this embodiment, the heat-dissipating body 131 includes an aluminum extruded back plate body. To be understood, in other embodiments, the back plate body can be made by other materials capable of dissipating the heat from the light source 132.

In one embodiment, as shown in FIG. 2, in order to firmly accommodate the components of the backlight module in the back plate 133, the backlight module further includes a frame sealant 134. The frame sealant 134 is engaged on the back plate 133 so as to form a box body, and the components are received in the box body.

Figure 9:
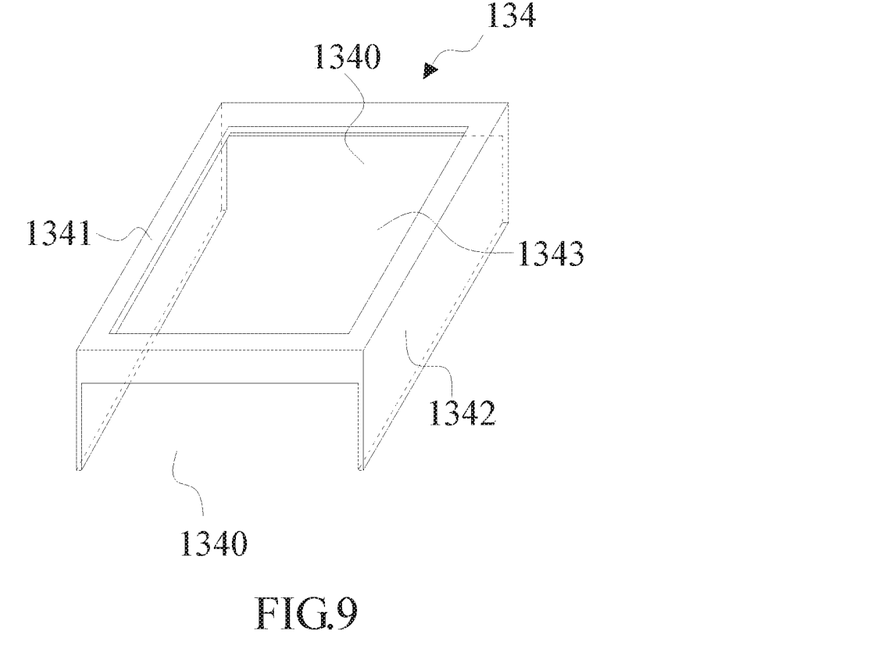
FIG. 9 is a structural schematic diagram of a frame sealant of the liquid crystal display device of FIG. 2.

FIG. 9 is a structural schematic diagram of a frame sealant of the liquid crystal display device of FIG. 2. Referring to FIG. 9, the frame sealant 134 includes a top surface 1341 and four sealant side walls 1342. The top surface 1341 is provide with an opening 1343. When the opening 1343 is opposite to the display area of the liquid crystal display device 100, the light outputted from the light guiding plate 135 can pass through the opening 1343 and reach the display screen 110.

The sealant four side walls 1342 extend from the top surface 1341 along a direction toward the bottom portion 1332 of the back plate 133. The four sealant side walls 1342 and the top surface 1341 form a box cap. When the frame sealant 134 is engaged on the back plate 133, the side walls 1331 of the back plate 133 are engaged and located at the inner side of the sealant side walls 1342.

In one embodiment, each of two sealant side walls 1342 opposite to the heat-dissipating body 131 is provided with a through hole 1340. The size of the through hole 1340 is not less than the size of the heat-dissipating body 131. Accordingly, in the procedure of repairing or replacing the light source 132, the operator can retrieve the heat-dissipating body 131 and the light source 132 without removing the frame sealant.

Figure 10:
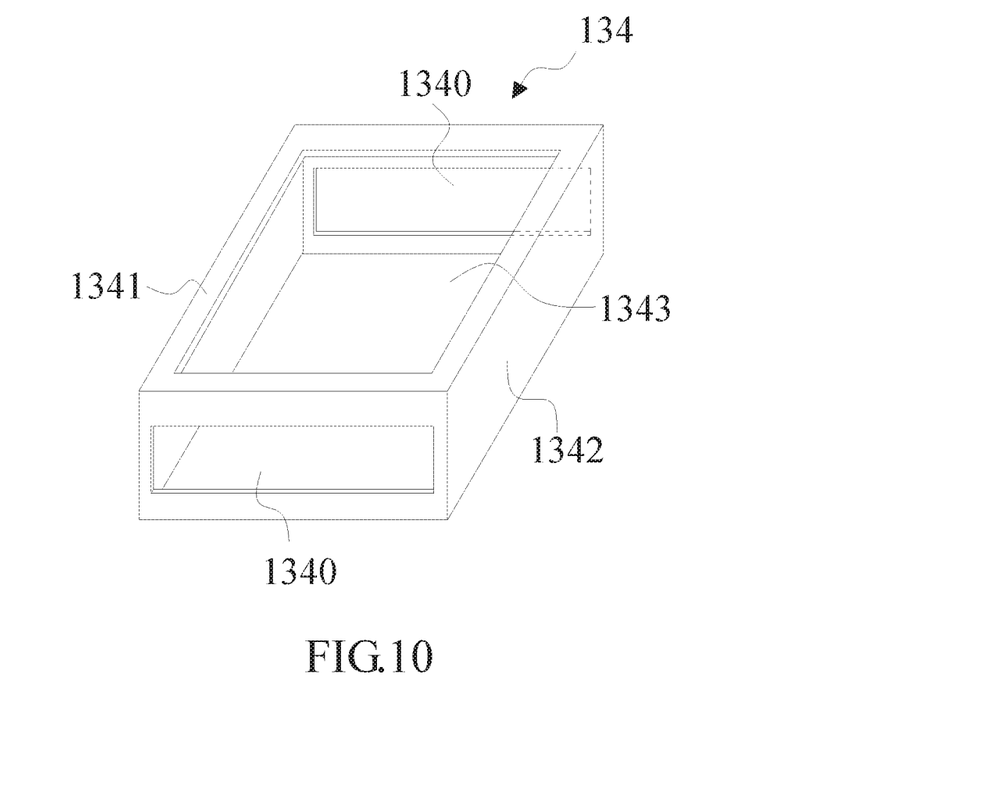
FIG. 10 is another structural schematic diagram of the frame sealant of the liquid crystal display device of FIG. 2.

To be understood, the parameters of the frame sealant 134, such as the shape, size and position of the through hole 1340, can be modified based on the parameters of the heat-dissipating body 131. For example, when the end portion of the heat-dissipating body 131 is not aligned with the edge of the side wall 1331 of the back plate 133, that is the heat-dissipating body 131 is located at the middle portion of the outer side of the side wall 1331 of the back plate 133, the shape of the through hole 1340 of the frame sealant 134 can be arranged as shown in FIG. 10.

This disclosure provides a liquid crystal display device adopting the above-mentioned backlight module. In the backlight module, the light source 132 is installed on the heat-dissipating body 131, and the heat-dissipating body 131 is detachably installed at the outer side of the side wall 1331 of the back plate 133 and covers the through hole portion 1333 of the side wall 1333. Accordingly, when the light source 132 is damaged, the heat-dissipating body 131 and the light source 132 can be retrieved from the backlight module without disassembling the display screen 110, optical films 136 and the likes. This design can decrease the steps of the procedure of repairing or replacing the light source 132, reduce the operation difficulty of repairing or replacing the light source 132, increase the performance of repairing or replacing the light source 132, and prevent the damage of the display screen 110, optical films 136 and other components so as to lower the damage risk of other components.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A backlight module, comprising:
   a heat-dissipating body;
   a light source disposed on the heat-dissipating body; and
   a back plate including at least one side wall, wherein the side wall of the back plate includes a through hole portion;
   wherein the heat-dissipating body is detachably installed at an outer side of the side wall of the back plate and covers the through hole portion, and the light source is received inside the through hole portion,
   wherein the heat-dissipating body is provided with a recess, and the light source is disposed in the recess.

2. The backlight module according to claim 1, further comprising a frame sealant, wherein a side wall of the frame sealant opposite to the heat-dissipating body is provided with a through hole, and a size of the through hole is not less than a size of the heat-dissipating body.

3. The backlight module according to claim 1, wherein when the light source is received in the through hole portion, a light output side of the light source is at least aligned with an edge of the through hole portion.

4. The backlight module according to claim 1, wherein an end portion of the heat-dissipating body is aligned with a bottom portion of the back plate.

5. The backlight module according to claim 1, wherein the heat-dissipating body is installed at the outer side of the side wall of the back plate by engaging.

6. The backlight module according to claim 5, wherein the side wall of the back plate is provided with an engaging slot, and a side wall of the recess is engaged in the engaging slot so that the heat-dissipating body is detachably installed at the outer side of the side wall of the back plate.

7. The backlight module according to claim 1, wherein the heat-dissipating body comprises an aluminum extruded back plate body.

8. The backlight module according to claim 1, wherein the back plate comprises two opposite side walls, and each of the opposite side walls of the back plate is provided with two through hole portions.

9. The backlight module according to claim 8, wherein the backlight module comprises four light sources.

10. The backlight module according to claim 1, wherein the heat-dissipating body is installed at the outer side of the side wall of the back plate by adhering.

11. The backlight module according to claim 1, wherein the light source is a LED light bar.

12. The backlight module according to claim 1, wherein a width of the through hole portion is greater than a width of the light source.

13. A backlight module, comprising:
    a heat-dissipating body provided with a recess;
    a light source disposed on the heat-dissipating body; and
    a back plate including at least one side wall, wherein the side wall of the back plate includes a through hole portion and an engaging slot;
    wherein a side wall of the recess is engaged in the engaging slot so that the heat-dissipating body is detachably installed at an outer side of the side wall of the back plate, the heat-dissipating body covers the through hole portion, the light source is disposed in the recess and received inside the through hole portion, and a plurality of end portions of the heat-dissipating body are aligned with an edge of the side wall of the back plate.

14. The backlight module according to claim 13, further comprising a frame sealant, wherein a side wall of the frame sealant opposite to the heat-dissipating body is provided with a through hole, and a size of the through hole is not less than a size of the heat-dissipating body.

15. The backlight module according to claim 13, wherein when the light source is received in the through hole portion, a light output side of the light source is at least aligned with an edge of the through hole portion.

16. The backlight module according to claim 13, wherein the heat-dissipating body comprises an aluminum extruded back plate body.

17. The backlight module according to claim 13, wherein the light source is a LED light bar.

18. A liquid crystal display device, comprising:
    a backlight module; and
    a display screen disposed at a light output side of the backlight module;
    wherein, the backlight module comprises:
    a heat-dissipating body;
    a light source disposed on the heat-dissipating body; and
    a back plate including at least one side wall, wherein the side wall of the back plate includes a through hole portion;
    wherein the heat-dissipating body is detachably installed at an outer side of the side wall of the back plate and covers the through hole portion, and the light source is received inside the through hole portion,
    wherein the heat-dissipating body is provided with a recess, and the light source is disposed in the recess.

* * * * *